US006811118B2

(12) United States Patent
Collet et al.

(10) Patent No.: US 6,811,118 B2
(45) Date of Patent: *Nov. 2, 2004

(54) LATCH DEVICE, IN PARTICULAR FOR LATCHING AN AIRPLANE LANDING GEAR OR AN AIRPLANE LANDING GEAR HATCH

(75) Inventors: Olivier Collet, Palaiseau (FR); Eric Felemez, Bures-sur-Yvette (FR); Pierre-Yves Liegeois, Suresnes (FR); Sébastien Fremiot, Boulogne-Billancourt (FR); Dominique Perathoner, Saint-Germain de la Grange (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/359,198

(22) Filed: Feb. 6, 2003

(65) Prior Publication Data

US 2003/0164421 A1 Sep. 4, 2003

(30) Foreign Application Priority Data

Mar. 4, 2002 (FR) .......................................... 02 02696

(51) Int. Cl.[7] .............................................. B64C 25/18
(52) U.S. Cl. ................................ 244/102 SL; 292/216; 244/102 A
(58) Field of Search .................... 244/100 R, 102 R, 244/102 A, 102 SL, 102 SS, 103 R, 104 R; 292/129, 124, 216, 229

(56) References Cited

U.S. PATENT DOCUMENTS

| 2,243,520 A | * | 5/1941 | Beharrell et al. | ............. | 89/133 |
| 2,567,114 A | * | 9/1951 | Linn | .................... | 244/102 SL |
| 2,660,029 A | * | 11/1953 | Geyer | ........................ | 60/709 |
| 2,937,541 A | * | 5/1960 | Barlow | ........................ | 74/532 |
| 3,504,406 A | * | 4/1970 | Schott | ......................... | 24/603 |
| 3,669,387 A | * | 6/1972 | Lucien | ................. | 244/102 SL |
| 4,049,222 A | * | 9/1977 | Peterson | .................. | 244/137.4 |
| 4,337,912 A | * | 7/1982 | Watton | .................. | 244/102 R |
| 5,288,037 A |   | 2/1994 | Derrien | | |
| 6,168,113 B1 | * | 1/2001 | Hann et al. | .............. | 244/129.4 |
| 6,279,853 B1 | * | 8/2001 | Brighton | ............... | 244/102 SL |

FOREIGN PATENT DOCUMENTS

| DE | 731274 | 2/1943 | |
| DE | 731 274 | 2/1943 | |
| EP | 0 265 197 | 4/1988 | |
| EP | 0265197 | 4/1988 | |
| FR | 1523401 | 5/1968 | |
| FR | 1 523 401 | 5/1968 | |
| FR | 2660029 | * 9/1991 | ............. F16D/3/16 |
| GB | 2 161 202 | 1/1986 | |
| GB | 2161202 | 1/1986 | |

* cited by examiner

Primary Examiner—Peter M. Poon
Assistant Examiner—Timothy D. Collins
(74) Attorney, Agent, or Firm—Sughrue Mion, PLLC

(57) ABSTRACT

A latch device, in particular for latching an airplane landing gear or an airplane landing gear hatch, the device comprising a box containing a set of hinged elements mounted to pivot about respective parallel axes, said assembly including at least one hook and a locking lever connected to said hook by an associated elastically deformable return device, said hook being capable of being unlocked by acting on said locking lever either via first actuator device in a normal mode of operation, or via a second actuator device in an emergency mode of operation when said first actuator device fails to unlock the hook. In accordance with the invention, the second actuator device associated with the emergency mode of operation is an electromechanical actuator under independent electrical control, said actuator comprising two electric motors associated in irreversible manner with a common differential gear train, having an outlet shaft controlling the pivoting of an emergency unlocking lever co-operating with the locking lever used in normal operation.

11 Claims, 7 Drawing Sheets

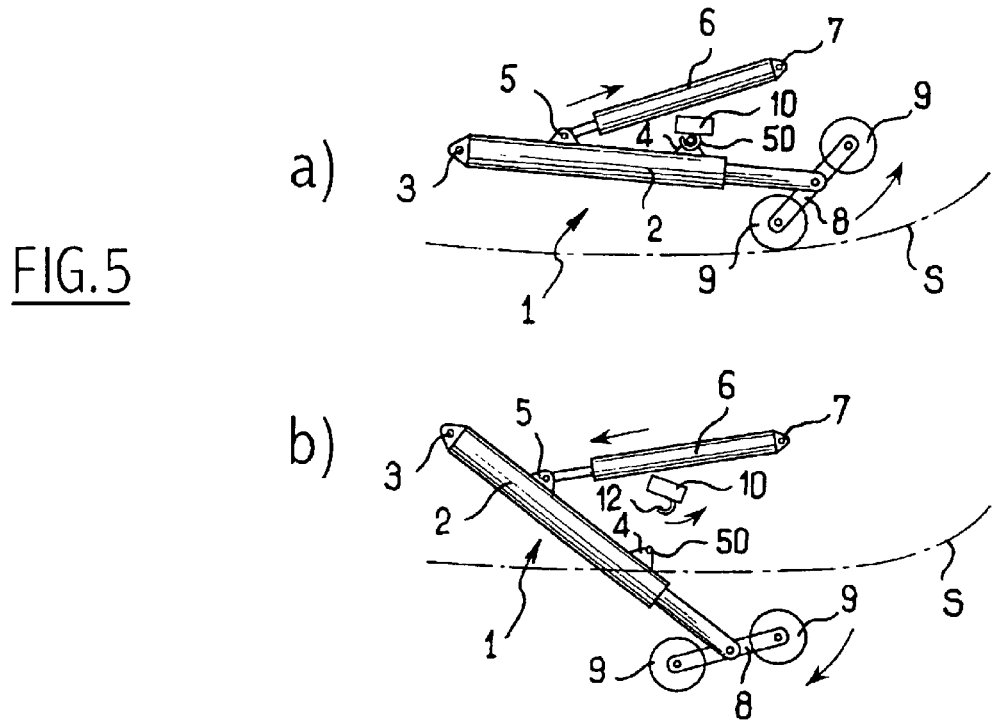
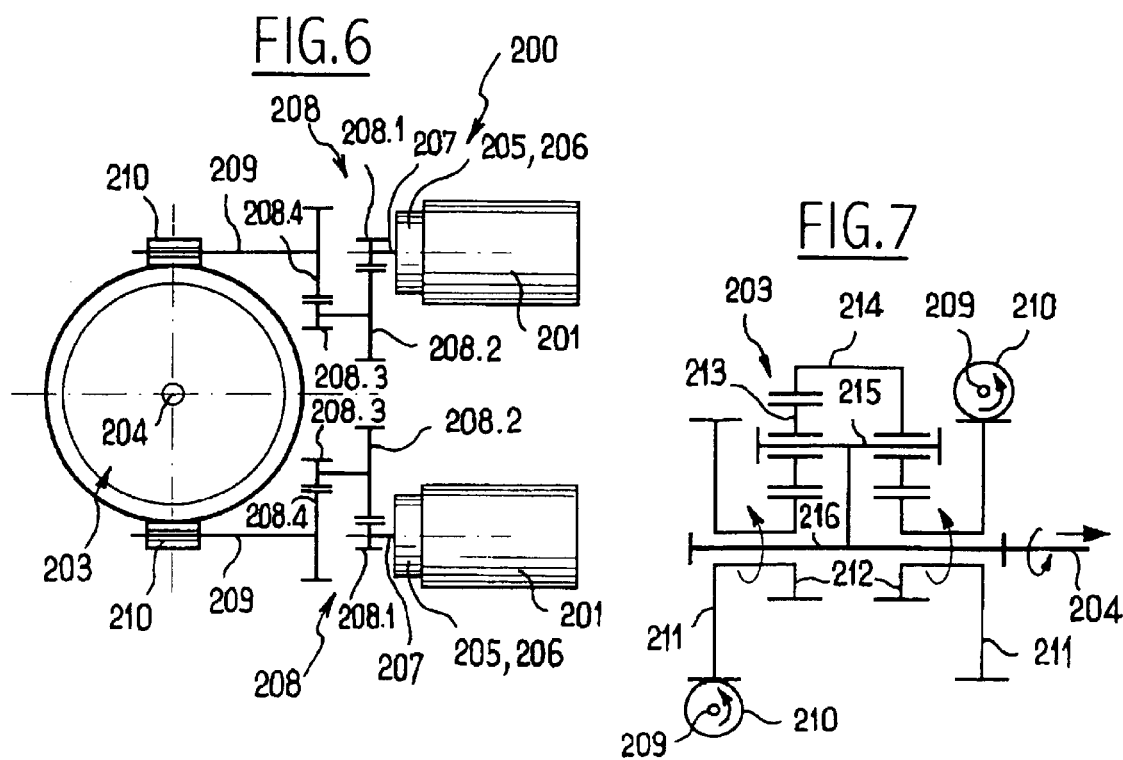

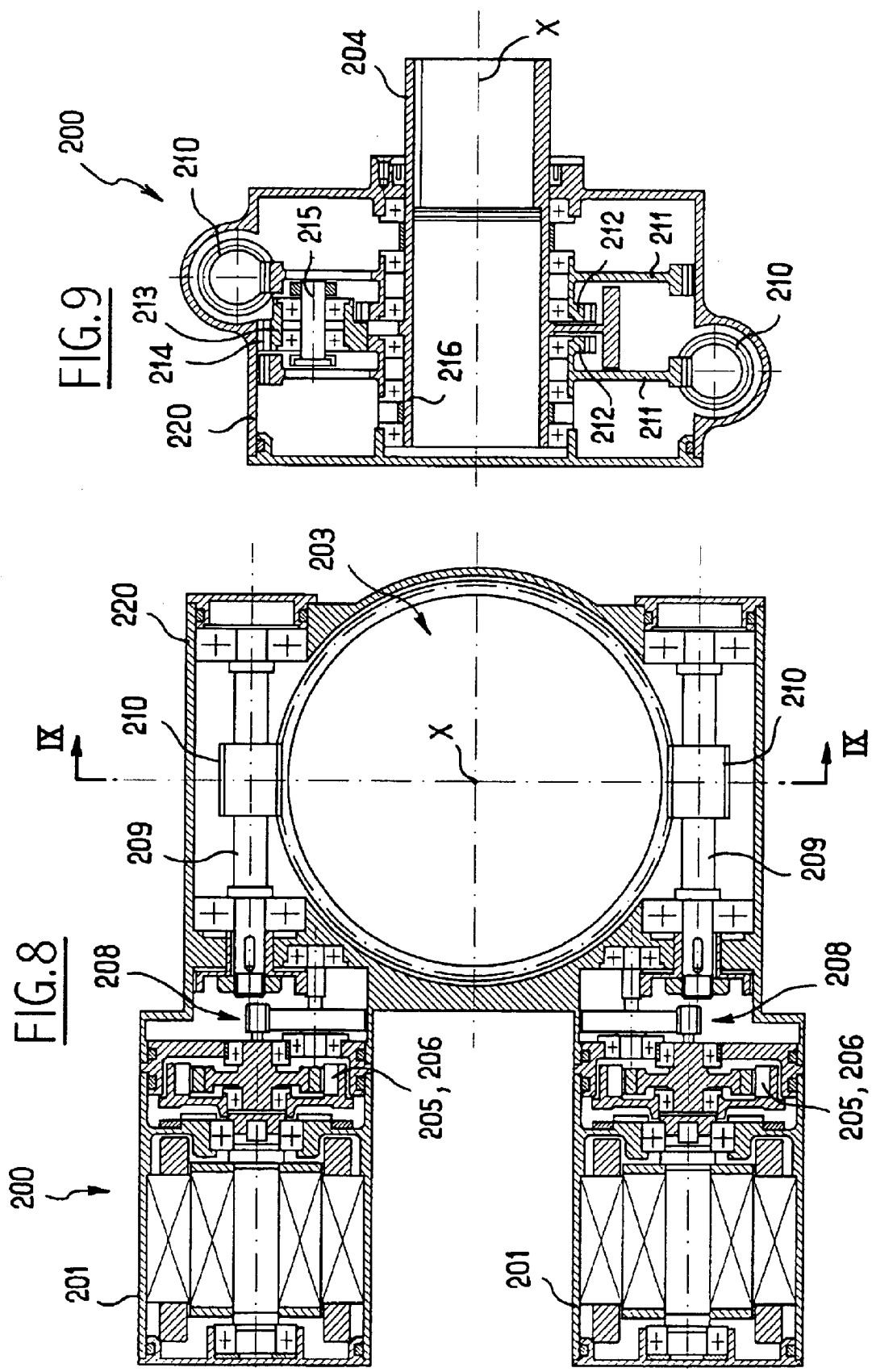

LATCH DEVICE, IN PARTICULAR FOR LATCHING AN AIRPLANE LANDING GEAR OR AN AIRPLANE LANDING GEAR HATCH

The present invention relates to a latch device, and more particularly to a device for latching an airplane landing gear or an airplane landing gear hatch.

BACKGROUND OF THE INVENTION

In a conventional approach, latch devices of this type comprise a box containing a set of hinged elements mounted to pivot about respective parallel axes, said assembly including at least a hook and a locking lever connected to said hook by associated elastically deformable return means. The hook can then be unlocked by acting on the locking lever either via first actuator means in a normal mode of operation, or via a second actuator means in an emergency mode of operation in the event of said first actuator means not managing to unlock the hook.

The main problem the invention seeks to solve relates to the structure and the arrangement of the second actuator means which is associated with the emergency mode of operation.

This second actuator means is used in an emergency mode of operation when the first actuator means fails to unlock the hook. This is a breakdown situation, in which the landing gear fails to be extended normally. The weight of the landing gear then acts as a large load on the hook. Consequently, in order to manage nevertheless to unlock the hook, it is necessary to develop a high level of torque in order to overcome any ceasing of the moving part.

Conventionally, the second actuator means associated with emergency mode operation is constituted by an electromechanical actuator implemented in the form of a common electric motor which controls both the rodding of the latch boxes of the airplane and the associated hydraulic valves. This requires the presence of a linkage that is relatively heavy and that is always difficult to adjust during maintenance. The manufacturer must ensure specific sequencing in an emergency situation: the hydraulics are initially switched off, then the hydraulics are connected to the return circuit; after which the hatch latches are released, and finally the landing gear latches are released.

The closest state of the art is illustrated by document U.S. Pat. No. 5,288,037 in the name of the Applicant.

That document describes a latching box of the type comprising a hinged locking lever having a first branch that carries a bearing wheel co-operating with a cam surface of a hook, and having a second branch that is connected, by means of a linkage, to the outlet shaft of a motor and stepdown gear box unit. For emergency unlocking, an oblong slot is provided in the linkage so as to enable the hook to pivot in spite of being locked, and an independent actuator sufficient to pivot the unlocking lever and disengage the bearing wheel. The independent actuator is, however, made in the form of a single-use pyrotechnic actuator (triggering by a powder cartridge which releases a propeller gas).

It should be observed that such a pyrotechnic actuator cannot be compared to an independently electrically controlled electromechanical actuator.

The technological background is also illustrated by documents DE-C-731 274, U.S. Pat. No. 3,504,406, and EP-A-0 265 197.

OBJECT OF THE INVENTION

It would thus be advantageous to design a latch device in which the second actuator means associated with the emergency mode of operation is capable of developing high torque in order to be able to unlock the hook while it is loaded, but without that making it necessary to overdimension the motors or to accept the constraints of a heavy linkage.

As a subsidiary point, another problem relates to the first actuator means which acts in a normal mode of operation.

The first actuator means is generally made in the form of a linear actuator of the hydraulic type. The advantage of such actuators is that they are reliable in operation since the technology has been mastered for a long time. Reference can be made to document GB-A-2 161 202.

That document describes a bolt which, in normal circumstances, secures the parts forming the hook. Action on the rod enables said connection to be unlocked in the event of blockage, and to be rotated relative to said parts. The actuating means associated with normal operation is a conventional linear actuator of hydraulic type (actuator 28).

At the end of the description, it is briefly indicated that electrically controlled actuating means can be used as a variant, but the text does not mention the power and the independent characteristic of said possible electrical control.

Nevertheless, the present trend is more and more towards limiting the use of hydraulic components because of their large weight and also because of the risk of leakage associated therewith.

In addition, with the hydraulic arrangement that is conventionally used, a single feed block is provided directing fluid both to the actuator for driving the landing gear and to the latch block. Thus, when it is desired to unlock the hook, the hydraulic control acts simultaneously on the drive actuator, thereby tending to further increase the load exerted on the hook, and consequently to make it necessary to use a latch device capable of developing a force that is sufficiently large to be capable of overcoming the load forces exerted on the hook and to be capable of absorbing the internal energy generated by opening the hook while under said loading. Naturally, the amount of power required means that it is necessary to provide elements that are of non-negligible weight, and that is always unfavorable in the field of aviation.

It thus appears to be advantageous to be capable of providing a latch device which is fitted with first actuator means associated with a normal mode of operation that are capable of achieving unlocking while developing a minimum amount of power, with unlocking also taking place in normal mode without generating noise or vibration, while nevertheless withstanding the high levels of heating that can be encountered.

BRIEF SUMMARY OF THE INVENTION

According to the invention, the main problem specified above is solved by a latch device, in particular for latching an airplane landing gear or an airplane landing gear hatch, the device comprising a box containing a set of hinged elements mounted to pivot about respective parallel axes, said assembly including at least one hook and a locking lever connected to said hook by associated elastically deformable return means, said hook being capable of being unlocked by acting on said locking lever either via first actuator means in a normal mode of operation, or via a second actuator means in an emergency mode of operation when said first actuator means fails to unlock the hook, the second actuator means associated with the emergency mode of operation being an electromechanical actuator under independent electrical control, said actuator comprising two electric motors associated in irreversible manner with a common differential gear train, having an outlet shaft controlling the pivoting of an emergency unlocking lever co-operating with the locking lever used in normal operation.

Advantageously, each motor of the electromechanical actuator is fitted downstream with a torque limiter, preferably of the magnetic type, and each motor is also fitted at its outlet with irreversible clamping means, e.g. of the magnetic, mechanical, or friction type.

In a first embodiment, the outlet shaft of each of the two motors engages an associated stepdown gear train, the respective outlet shaft thereof being coupled in irreversible manner to the common differential gear train, the outlet shaft of the common differential gear train causing the emergency unlocking lever to pivot. In particular, each stepdown gear train comprises spur gears, and the irreversible connection of its outlet shaft to the common differential gear train which is likewise made of spur gears, is provided by means of an associated wormscrew.

In another embodiment, the outlet shaft of each of the two motors is coupled in irreversible manner to the common differential gear train, and the outlet shaft of said common differential gear train is connected to the inlet of an epicyclic stepdown gear train, the outlet shaft of said epicyclic stepdown gear train causing the emergency unlocking lever to pivot. In particular, the irreversible connection of each outlet shaft with the common differential gear train which is made up of spur gears is provided by means of an associated wormscrew.

In yet another embodiment, the outlet shaft of each of the two motors is connected to a common differential gear train made of bevel gears via an associated non-return mechanism, and the outlet shaft of said common differential gear train is connected via a torque limiter to a stepdown gear train whose outlet shaft causes the emergency unlocking lever to pivot. In particular, the torque limiter is a friction torque limiter, and the stepdown gear train is made of spur gears.

Also preferably, the electromechanical actuator with its two electric motors and its common differential gear train is fixed to the box in removable manner, and is easily accessible, thereby enabling it to be directly replaced by another actuator without needing to dismantle said box.

Finally, and advantageously, the first actuator means associated with the normal mode of operation is likewise an electromechanical actuator under independent electric control, said actuator being of low power and being constituted by an electromagnet, or a motor and stepdown gear box unit, or a torque motor of small size.

Other characteristics and advantages of the invention appear more clearly in the light of the following description and the accompanying drawings, relating to a particular embodiment.

BRIEF DESCRIPTION OF THE DRAWINGS

Reference is made to the drawings, in which:

FIG. 5 is a diagram showing a method of operating the above-described latch device in a normal mode of operation with FIG. 5a) showing prior unloading of the hook, and FIG. 5b) showing the hook being unlocked and the gear train being lowered in normal manner:

FIG. 6 is a diagram showing the structure of the second actuator means associated with the emergency mode of operation, in accordance with a first embodiment of the invention;

FIG. 7 is a diagram of the common differential gear train in the actuator means shown in FIG. 6;

FIG. 8 is a section through the structure of the above actuator means;

FIG. 9 is a section on IX—IX of FIG. 8 showing more clearly the common differential gear train and the outlet shaft which pivots the emergency unlocking lever (as shown in FIG. 3);

DETAILED DESCRIPTION OF THE INVENTION

Figure 1:
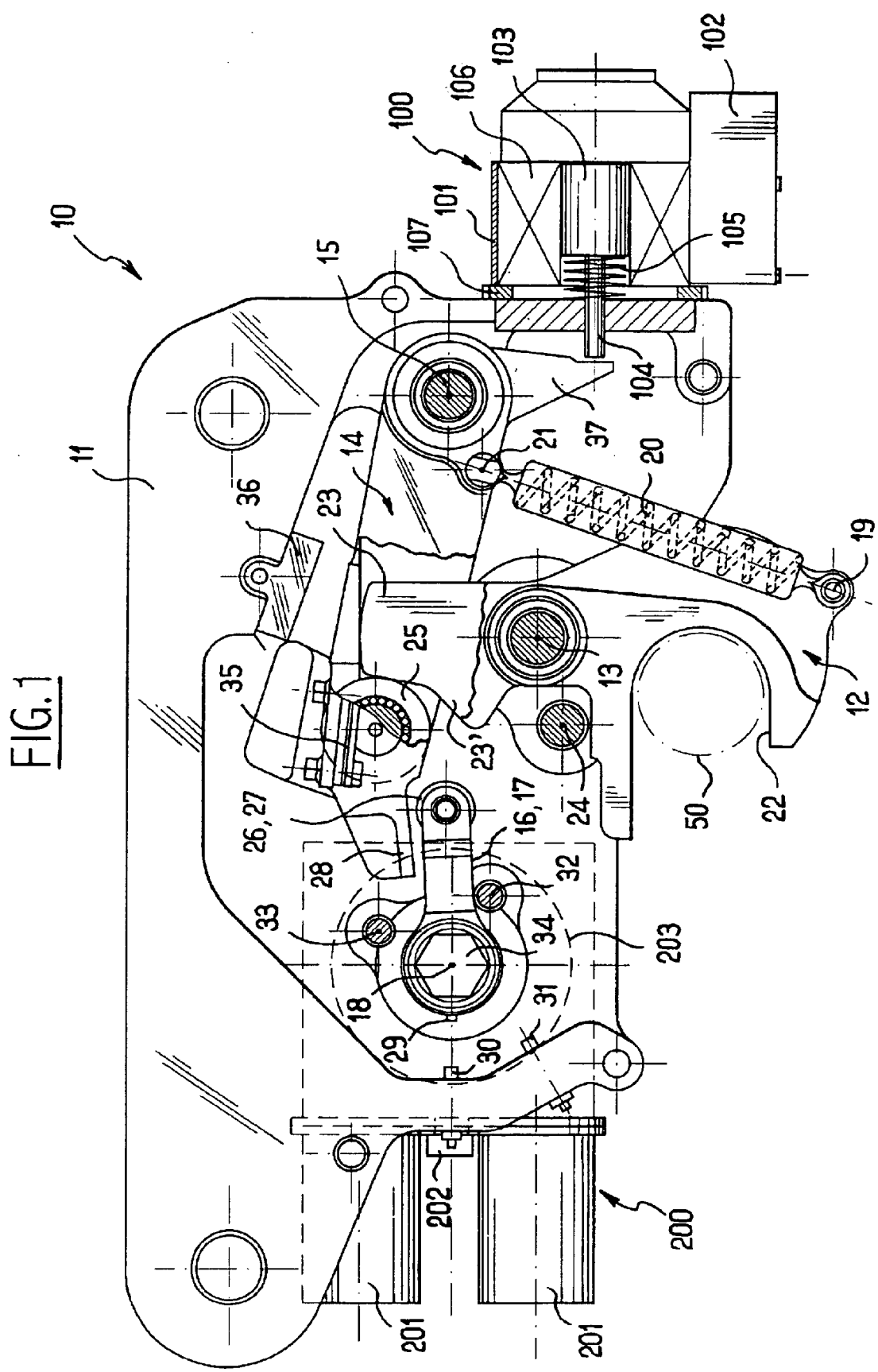
FIG. 1 shows a latch device in accordance with the invention, with the hook in its normal locked position.

The description begins with the general structure of the latch device of the invention which is specifically intended to latch an airplane landing gear or an airplane landing gear hatch. For this purpose, reference is made to FIGS. 1 to 4 which show the various components of a latch device of the invention in its various modes of operation. In all of these figures, the view of the latch device corresponds to an elevation view of the device after removing one or two side plates constituting the box for said device. For greater clarity, the axes of the hinged elements and the abutments for some of these elements are shown in section, said axes and abutments being parallel to a direction extending transversely to the plane of the side plates of the box.

The latch device 10 comprises a box 11, of which there can only be seen one of the two side plates constituting said box. The box contains a set of hinged elements which are mounted to pivot about respective parallel axes. This assembly constitutes a linkage which essentially includes two fundamental components, namely: a hook 12 mounted to pivot about an axis 13, and a locking lever 14 mounted to pivot about an axis 15 and connected to said hook by associated elastically deformable return means 20. The deformable means 20 are specifically constituted by two coil springs secured at 19 to the hook 12 and at 21 to the lever 14. Naturally, such a two-component system merely constitutes an example to illustrate the invention, it being understood that other types of linkage could be used having more than two components, for example a three-component linkage including an intermediate lever between the locking lever and the hook.

The position in FIG. 1 corresponds to a normal locked position for the hook 12, in which the hook holds a nut 50 (in chain-dotted lines in the figure) of the system to be locked, for example forming part of an appendix secured to a landing gear leg. The bottom portion 22 of the hook 12 thus serves to hold the nut 50 in place. The top portion 23 of the same hook 12 passes between the two side plates constituting the locking lever 14, and in this position bear against a wheel 25 carried by said lever 14. The hook 12 also has an intermediate projection 23' which plays no part in this normal locked position. 35 designates a sensor target carried by the locking lever 14 and co-operating with one or other of two sensors (not shown in this figure) carried by a side plate of the box 11 for the purpose of sending a signal indicating the position of the lever 14, specifically the proper locked position of said lever.

Two other types of hinged elements are also provided in the latch device 10, and relate specifically to emergency and to maintenance situations of operation. Thus, there are two levers 16, 17 juxtaposed on a common axis 18, and at the end of each of these levers there is provided a respective wheel 26, 27 for co-operating with a front nose 28 of the locking lever 14. A system of low and high abutments 32, 33 is provided for each of these two levers 16, 17 so as to limit the range over which said levers can pivot.

As explained below, the lever 16 which is behind the lever 17 in FIGS. 1 to 4 is controlled by actuator means constituted by an electromechanical actuator associated with an emergency mode of operation, said actuator being referenced 200. The particular structure of this emergency actuator means 200 is described in greater detail below.

It should also be observed that the lever 16 carries a projection 29 projecting from the other side of the axis 18, which projection 29 acts as a target for two angular position sensors 30 and 31 which are fixed to the box 11 of the device. In normal operation mode, the lever 16 is not involved and the sensor 30 associated therewith detects that the projection 29 is in its correct position which corresponds to the lever 16 bearing against the low abutment 32. The lever 17 is pressed against the same low abutment by a torsion spring integrated around the axis of said lever, with said lever 17 being actuated by a hexagonal endpiece 34 on its axis.

The hook 12 can be unlocked by acting on the locking lever 14 using first actuator means 100 in normal operation mode, which actuator means is constituted by a low power electromechanical actuator with independent electrical control.

Specifically, the electromechanical actuator 100 is an electromagnet which is fixed via its own sealed housing 101 to the box 11 of the latch device 10, via a fixing ring 107. The plunger core 103 of the electromagnet 100 controls axial displacement of a pusher 104 acting on the locking lever 14, and more particularly by co-operating with a projecting appendix 37 on the locking lever 14 which is provided on said lever in the vicinity of its pivot axis 15. In a variant it is possible to provide for the plunger core to control rotary displacement of the pusher (which variant is not shown herein). It can also be seen that the electromagnet 100 includes a spring 105 tending to urge the pusher 104 towards a retracted position, which position corresponds to the locking lever 14 being in a locked position. This retracted position of the pusher 104 corresponds to FIG. 1. The winding 106 of the electromagnet 100 is shown diagrammatically inside the associated housing 101, which winding is preferably of the double-coil type. This makes it possible using associated control means housed in a control housing 102 to organize successive power feeding sequences enabling the pusher to be moved quickly outwards, while limiting the extent to which the windings heat up. The pusher 104 acts on the projecting appendix 37 and must be capable of overcoming the reaction force it encounters in order to be able to move the locking lever 14 so as to cause it to pivot about its axis 15 until the hook 12 has been released to pivot about its axis 13, and consequently until the nut 50 is released.

It would also be possible to provide a system for reducing the amount of electricity that is consumed by the electromagnet 100 after the plunger core has finished moving (end of its unlocking stroke). Such a system could be implemented using state sensors (locked—not locked) fitted to the box, or indeed an electronic timer.

The electromagnet 100 is preferably fixed to the box 11 in removable manner, and is easily accessible, thus enabling it to be replaced directly by another electromagnet without any need to disassemble the box itself.

Figure 2:
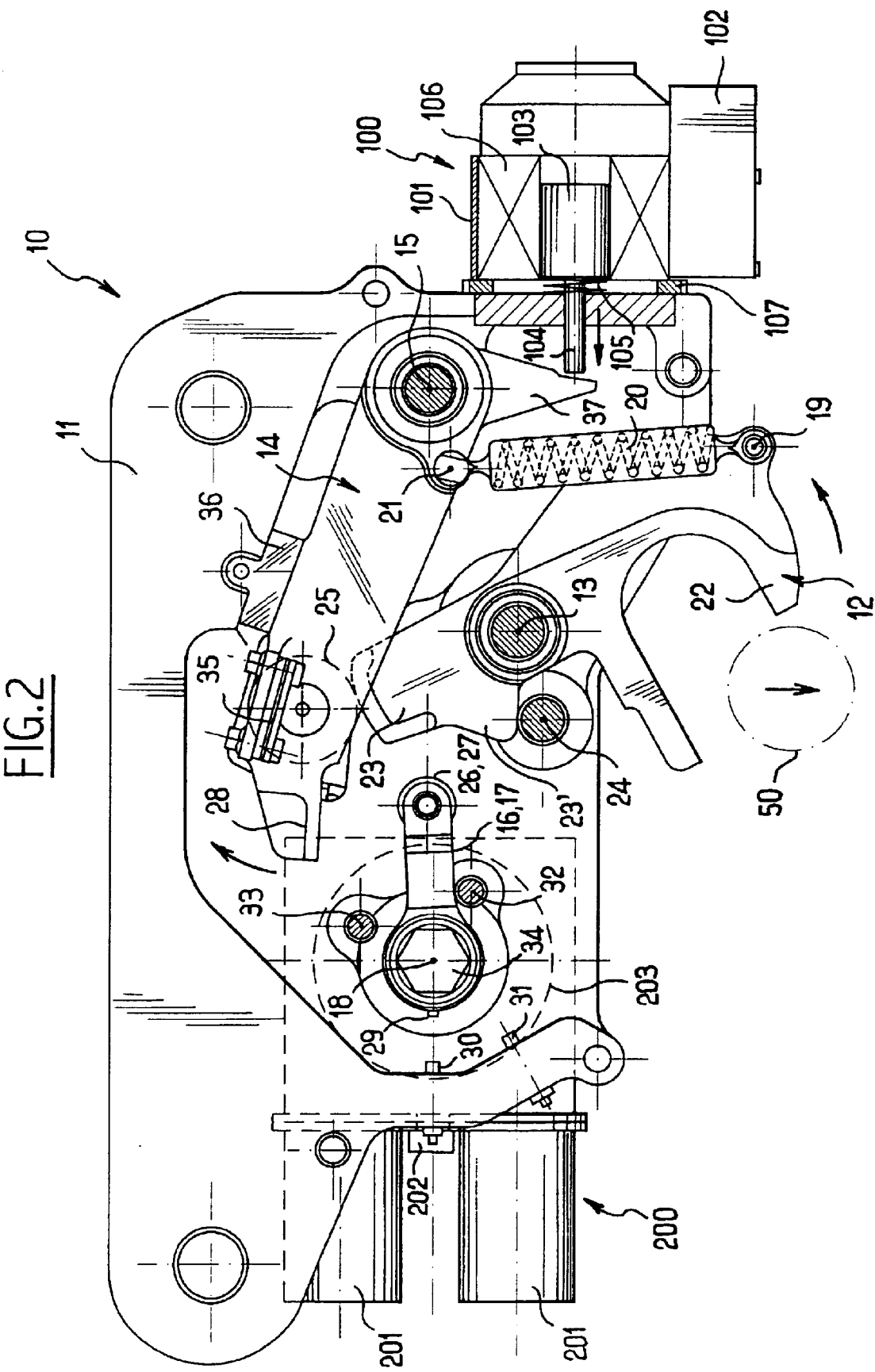
FIG. 2 is a view analogous to FIG. 1, showing normal mode unlocking, i.e. using a first actuator means which is implemented specifically in the form of an electromagnet.

With reference now to FIG. 2, there can be seen the positions of the various components of the above-described latch device 10 during normal unlocking.

The electromagnet 100 is then excited by the associated control means 102, thereby causing the pusher 104 to be extended so that it co-operates with the projecting appendix 37 of the locking lever 14. The lever 14 then pivots clockwise about its axis 15, and the hook 12 whose head 23 remains in contact with the wheel 25 carried by the lever 14 can then begin to pivot about its axis 13 in the counterclockwise direction, while remaining subject to the action of the springs 20. When the wheel 25 reaches the cam path provided on the top portion 23 of the hook, the hook 12 can then begin to pivot towards its unlocked position as shown in FIG. 2, in which position the appendix 23' bears against the associated abutment 24, with this continuing so long as the electromagnet 100 continues to be powered. The nut 50 is then released and the landing gear is thus free to be lowered, or the landing gear hatch associated therewith is free to open. The position shown in FIG. 2 is a naturally stable position, and there is no need to maintain the excitation current in the electromagnet 100, which means that this power feed can be switched off and the pusher 104 allowed to return to its retracted position, which is its rest position, under drive from an associated spring 105. In this unlocked position, the locking lever 14 bears against a ramp 23 of the hook 12 via its wheel 25. A high abutment 36 can also be provided which is fixed to the box 11, and which is preferably made of a deformable material in order to avoid any undesirable impact or vibration.

It can readily be understood that an electromagnet of small size, such as that shown in the figure, is capable of developing only a moderate amount of force, and in particular is incapable of causing the hook 12 to pivot when under full load merely by pivoting the locking lever 14.

It is therefore advantageous to ensure that the actuator means can remain small in size and in weight, since this is particularly desirable in the field of aviation.

Thus, a method of operating the above-described latch device 10 is provided, said device being used for securing an aircraft landing gear which is caused to move from its gear-down position to its gear-up position in conventional manner under the control of a driving actuator.

In order to understand the steps of this method of operation, reference is made to FIG. 5 which is a highly diagrammatic representation of reality.

In portion a), there can be seen the landing gear 1 of an airplane which is shown in highly diagrammatic manner. The landing gear 1 thus comprises a leg 2 hinged at 3 to the structure S of an airplane, and at the end of said leg there is a rocker beam 8 carrying two pairs of wheels 9. A drive actuator 6 is associated with pivoting the leg 2, said actuator having its cylinder connected to a point 7 of the structure S of the airplane and having its rod connected to an appendix 5 on the leg 2. An appendix 4 carries the nut 50 mentioned above, which is intended to co-operate with the hook 12 of the latch device 10.

In portion a), the position shown corresponds to a landing gear up position, which is the position that is to be found when beginning to actuate the latch device to allow the landing gear to be lowered. In this position a), the nut 50 is held captive by the hook 12 of the latch device 10.

This is when the operating method of the invention is applied in order to release the retracted landing gear in application of the following succession of steps.

The first step is to act on the drive actuator 6 for the landing gear 1 so as to tend to retract said landing gear, thereby releasing the load on the hook 12 of the latch device 10, which is represented by the arrows shown in position a). This is made possible by the control of the latch device 10 being made independent of the control of the drive actuator 6, unlike prior art configurations. The action of the drive actuator 6 then tends to raise the leg of the landing gear very slightly, thereby unloading the hook 12, so that the force exerted by the nut 50 changes direction.

The first actuator means 100 are the operated, and specifically the electromagnet, in order to unlock the hook 12 as unloaded in this way. The force to be overcome is then reduced to the force developed by the springs 20, so it is possible to make do with low-power actuation, and consequently to use an actuator of small mass.

As shown in portion b), once the hook 12 has been unlocked, it is possible to control the drive actuator 6 in the normal manner for lowering the landing gear 1, while the actuator 100 continues to be powered.

It is advantageous for the electromechanical actuator that is involved in normal operation to be implemented in the form of an electromagnet as shown herein, since the sequence can be performed very quickly, for example in about one-tenth of a second. Nevertheless, in a variant, this electromechanical actuator could be implemented in the form of a linear electrical actuator, or indeed in the form of a motor-and-gear-box unit, or a small-sized torque motor.

In all circumstances, it suffices to use an electromechanical actuator of low power, i.e. of power that is much less than the power that would be necessary if the hook for unlocking was still loaded. The amount of power required naturally depends on the type of landing gear or hatch, but as an indication, a typical value for a large airliner would be of the order of 300 watts.

The above-described sequence in which the mechanical load is relaxed by the drive actuator makes it possible to perform unlocking without making any noise or vibration in normal mode operation.

It will be understood that it is important for the electromechanical actuator associated with normal mode operation to be of low power and to be under independent electrical control.

If a prior art type linear actuator under electrohydraulic control were to be retained, and if the only independent control provided were the control to the actuator of each latch device, that would require an additional electrically-controlled distributor valve to be provided in order to control the landing gear after operating the latch device. Furthermore, if the electrohydraulic actuator were merely replaced by the electromechanical actuator described herein, but with control dependent on that of the drive actuator, then the device would be very bulky since it would be necessary to develop a large amount of power on a heavily-loaded box.

The description below relates to emergency and maintenance modes of operation, which modes of operation do not make use of the electromagnet 100 as described above.

In accordance with an essential aspect of the invention, a second actuator means 200 associated with emergency mode operation is provided, which means is likewise constituted by an electromechanical actuator under independent electrical control, comprising two electric motors 201 associated in irreversible manner with a common differential gear train 203 having an outlet shaft which pivots the associated emergency unlocking lever 16 which co-operates with the locking lever 14 used in normal operation.

Figure 3:
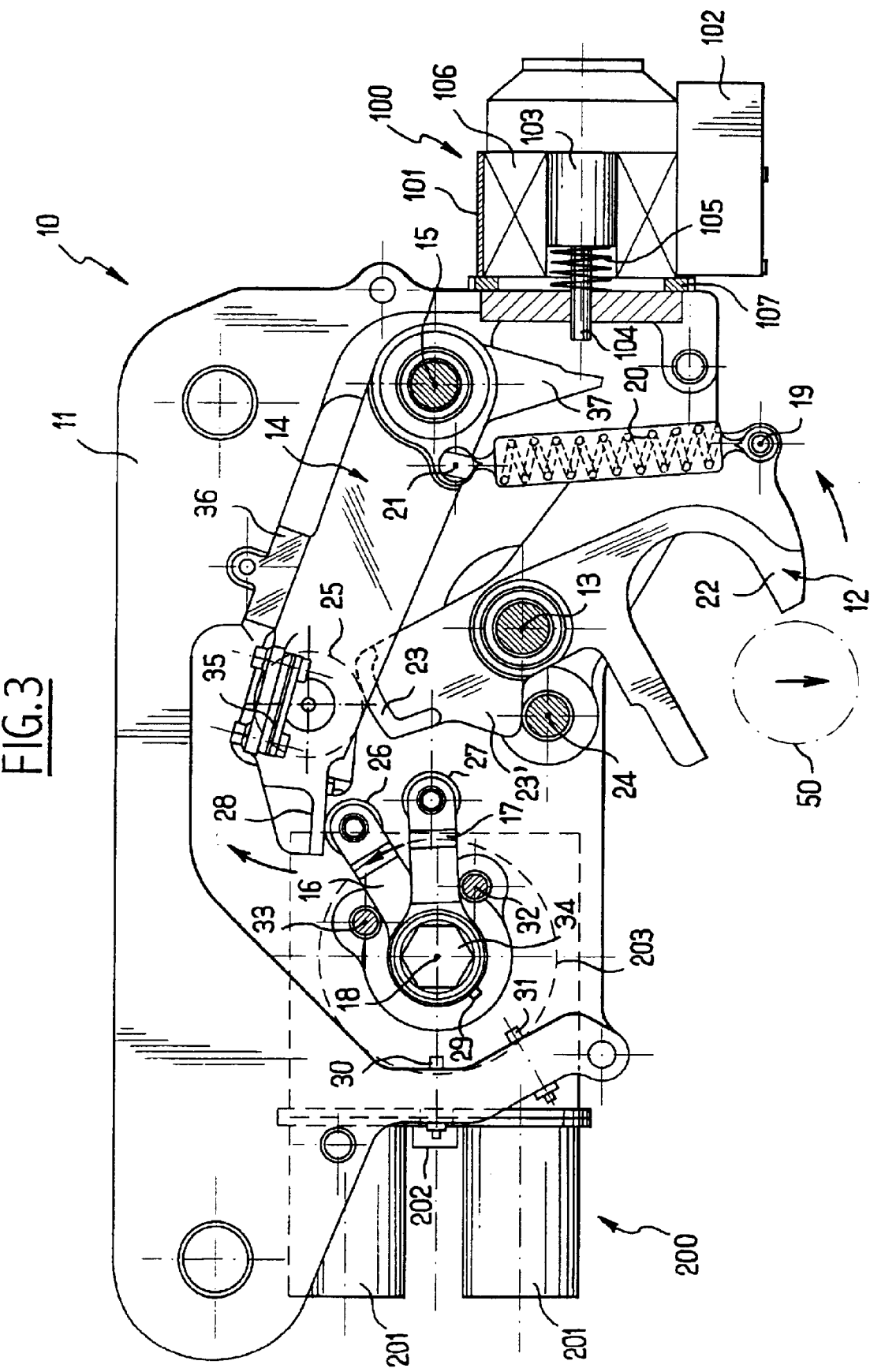
FIG. 3 is a view analogous to the preceding figures, showing an emergency unlocking sequence involving the second actuator means associated with the emergency mode of operation, which actuator means is implemented in accordance with the invention in the form of an electromechanical actuator comprising two electric motors associated irreversibly with a common differential gear train.

Emergency unlocking mode which is used in the event of a breakdown is shown in FIG. 3.

Under such circumstances, the electromechanical actuator 200 of the invention, whose independent electrical control is referenced 202 acts to cause the emergency unlocking lever 16 to pivot under drive from at least one of its two electric motors 201. By way of example, the two motors 201 could be asynchronous motors powered with three-phase AC. In FIG. 3, it can be seen that the emergency locking lever 16 which is not visible in FIGS. 1 and 2 has pivoted counterclockwise, causing the locking lever 14 to pivot clockwise by means of its associated wheel 26 co-operating with the front nose 28 of said lever 14. The extent to which the emergency unlocking lever 16 can pivot is limited by the associated high abutment 33. In order to avoid any damage to the electromechanical actuator 200, it is naturally appropriate to provide a torque limiter with slip so that when the emergency unlocking lever 16 comes into abutment that does not damage the components of said actuator. In this position, the projection 29 associated with the lever 16 comes into register with the bottom sensor 31 which can then send a corresponding signal to the central control unit of the airplane. The pivoting of the lever 14 about its axis 15 with the improvement of the connection via the springs 20 causes the hook 12 to pivot about its axis 13. The nut 50 can then be released, as is the case after a normal unlocking sequence.

Figure 4:
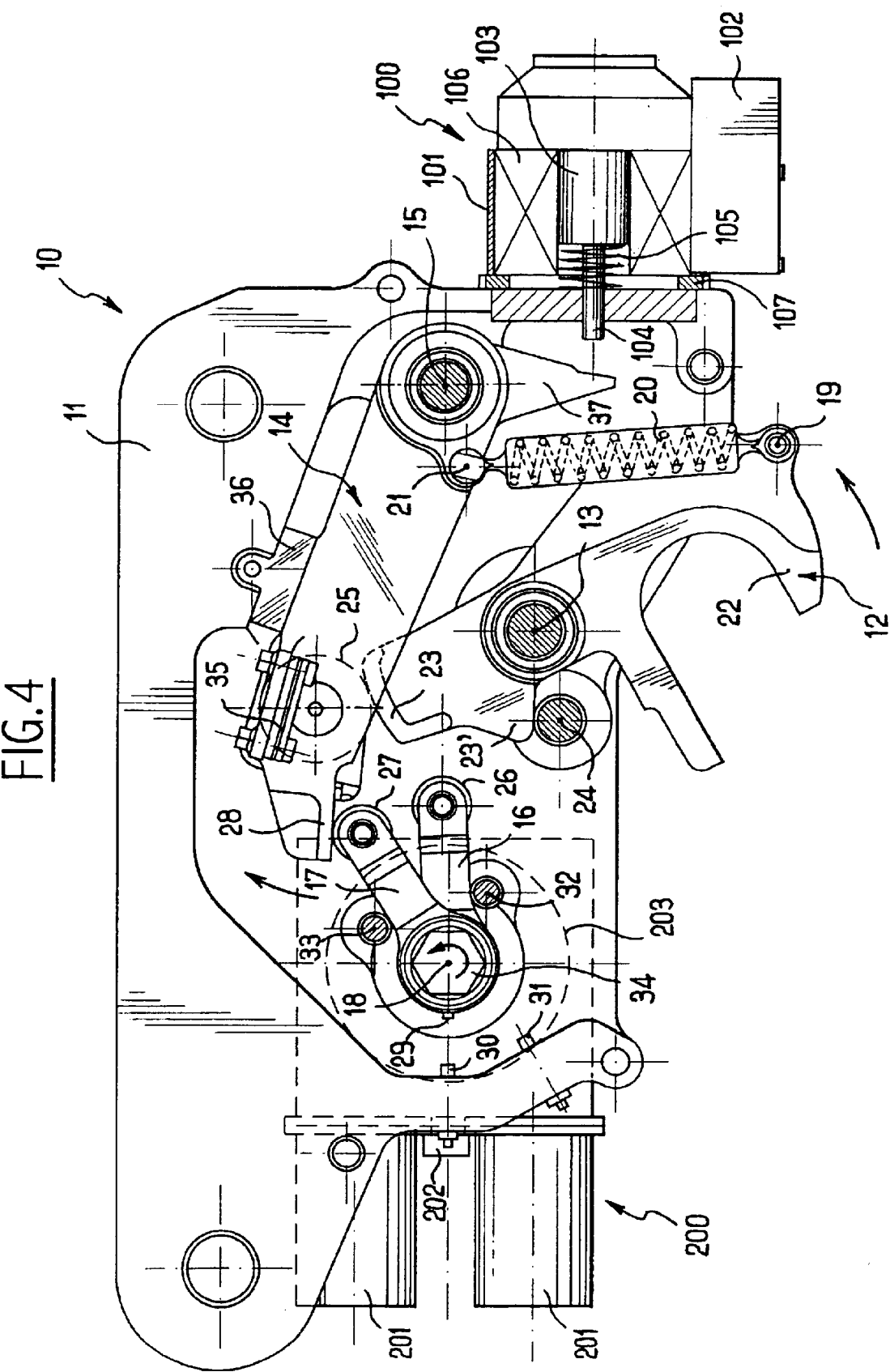
FIG. 4 is a view analogous to the preceding figures, showing a hook unlocking sequence in a maintenance mode by taking manual action on a maintenance unlocking lever.

FIG. 4 shows a sequence that is similar to the preceding sequence, and relates to unlocking for maintenance purposes.

Instead of using the emergency unlocking lever 16, it is the adjacent maintenance unlocking lever 17 which is actuated, by using an appropriate tool acting on the hexagonal endpiece 34. The lever 17 then pivots against the reaction of an associated torsion spring integrated in the endpiece 34 until it comes into abutment against the high abutment 33, thereby causing its wheel 27 to cooperate with the front nose 28 of the lever 14 and thus causing the lever 14 to pivot upwards and consequently causing the hook 12 to pivot about its axis 13. Naturally, it is necessary to maintain force on the tool used in order to keep the lever 17 in its high position since if this force is released, than the torsion spring integrated in the endpiece 34 causes the lever 17 to be returned immediately to its natural rest position, where it comes into abutment against the low abutment 32.

The structure of the electromechanical actuator 200 associated with emergency mode operation is described in greater detail below with reference to FIGS. 6 to 9, which show preferred embodiments.

Each electric motor 201 of the electromechanical actuator 200 of the invention is fitted with a respective downstream torque limiter 205 (e.g. of the magnetic, mechanical, or friction type) for absorbing kinetic energy when the emergency unlocking lever 16 comes into contact with the high abutment 33, and with irreversible clamping means 206, likewise preferably of magnetic type, in order to preserve the irreversible nature of the transmission, even in the event of high levels of vibration and large shocks. The outlet shaft of each motor 201 is referenced 207. The outlet shaft 207 engages an associated stepdown gear train 208 having respective outlet shafts 209 coupled in irreversible manner to the common differential gear train 203, the outlet shaft 204 of said common differential gear train controlling pivoting of the emergency unlocking lever 16 as described above. Each gear train 208 is made up of spur gears: there can thus be seen in succession from the outlet shaft 207 of each motor 201 to the respective outlet shaft 209 a succession of gears 208.1, 208.2, 208.3, and 208.4. Furthermore, the irreversible connection of the outlet shaft 209 from each gear train 208 to the common differential gear train 203 is provided via an associated wormscrew 210.

The common differential gear train 203 can be seen more clearly in FIGS. 7 to 9 and is likewise made up of entirely out of spur gears. Each wormscrew 210 drives a gear 211 which caries a smaller gear 212 coaxially. One of the gears 212 meshes with planets 213, only one of which can be seen in FIGS. 7 and 9, the other gear 212 meshing with a gear ring 214 associated with the housing of the gear train referenced 220. The shaft 215 associated with the planet 213 is secured to a central shaft 216 passing through the spur gears 211 and 212, finally exiting via the outlet shaft 204 which causes the emergency unlocking lever 16 to pivot.

FIGS. 8 and 9 show the mechanical structure of the above-described component in greater detail, while FIGS. 6 and 7 are schematic diagrams.

By means of this arrangement, when the two motors 201 are excited, the outlet shaft 204 is caused to rotate, thereby pivoting the emergency unlocking lever 16. High torque is thus made available for performing this unlocking operation. In the event of one of the motors 201 breaking down, the remaining motor is capable of achieving the same outlet torque on the shaft 204, with the time required for actuation merely be doubled. The two-motor arrangement is extremely advantageous since it provides great flexibility and a very high level of safety, and since it makes it possible to avoid any motor having to provide the necessary torque on its own, which would have required the motors to be overdimensioned in undesirable manner. When the electrical power supply to the motors 201 is switched off, the lever 16 remains in its high position shown in FIG. 3. In order to return the lever 16 to its low position, it suffices to use appropriate electronics to interchange two of the three AC phases.

Figure 10:
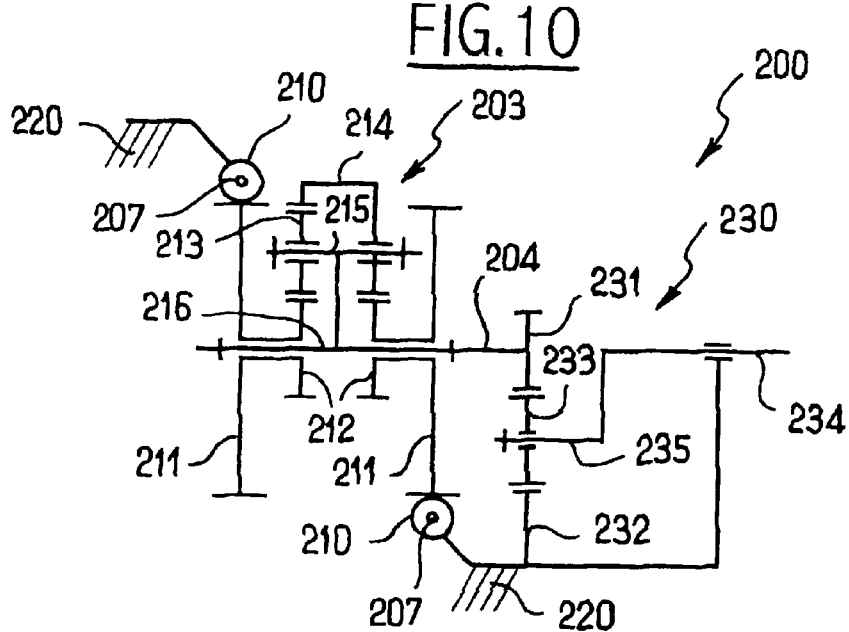
FIG. 10 shows a variant embodiment of the actuator means of the invention, associated with the emergency mode of operation, the actuator then comprising an epicyclic stepdown gear train associated with the common different gear train.
Figure 11:
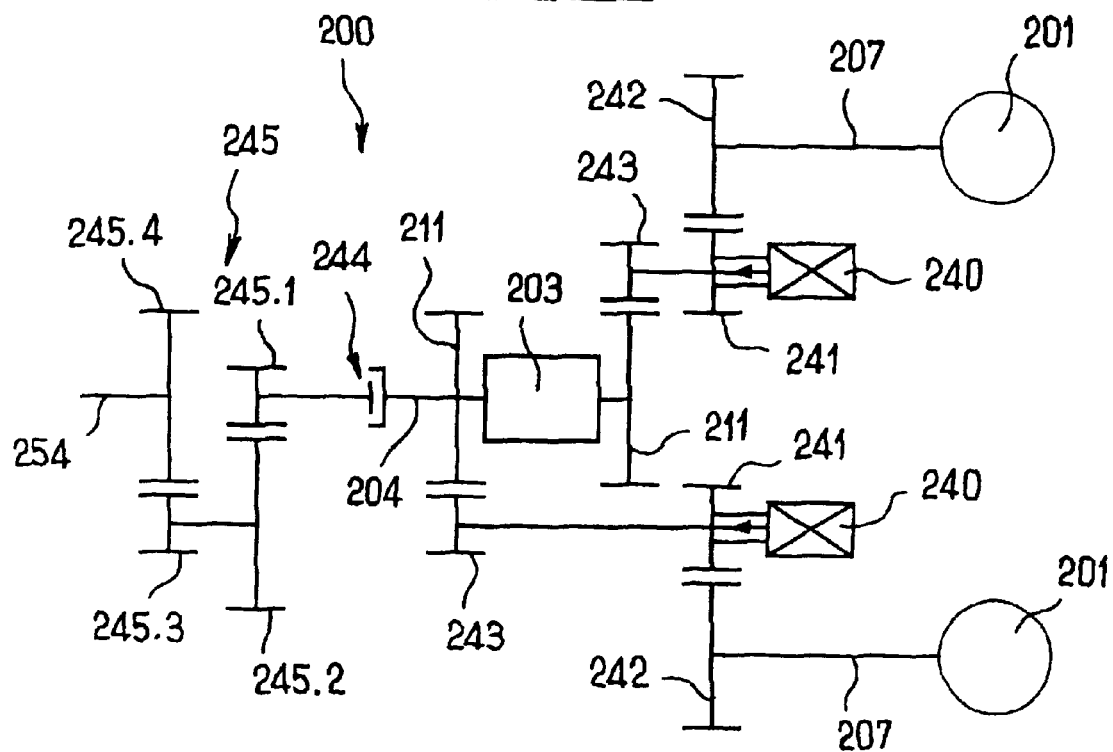
FIG. 11 is a diagram showing yet another variant of the actuator of the invention associated with the emergency mode of operation, said actuator then comprising a common differential gear train based on bevel gears and an associated non-return mechanism, together with a torque limiter and a stepdown gear train.

Naturally it is possible to provide other variants enabling the desired level of torque to be obtained for actuating the emergency unlocking lever 16, and by way of example, two possible variants that could also be envisaged are shown in FIGS. 10 and 11.

FIG. 10 thus shows a first variant of the invention in a diagram that is similar to FIG. 7.

Unlike the preceding embodiment, the outlet shaft 207 of each motor 201 itself carries a wormscrew 210, thereby ensuring irreversible coupling between the outlet shaft 207 of each motor 201 and the common differential gear train 203. The common differential gear train 203 is identical to that of FIG. 7, so there is no need to describe it again. The outlet shaft 204 from this common differential gear train 203 is now connected to the inlet of an epicyclic stepdown gear train 230 whose outlet 234 causes the emergency unlocking lever 16 to pivot. The epicyclic gear train 230 has a sun wheel 231, planets 233, and a gear ring 232, the shaft 235 associated with each planet 233 being securely connected to the outlet shaft 234 which is coaxial with the outlet shaft 204 of the common differential gear train 203. 220 represents diagrammatically the connection with the housing for the system, which can in particular include the ring 232 which is held in fixed manner to said housing 220.

Thus, in this case also, the irreversible connection between each outlet shaft 207 and the differential gear train 203 made of spur gears is provided by means of an associated wormscrew 210. Such an embodiment enables high stepdown ratios to be obtained.

Another variant of the invention is shown in FIG. 11, of a structure that is more complex than that of the systems described above.

In the device of FIG. 11, the outlet shaft 207 from each of the two motors 201 is connected to a common differential gear train 203 made up of bevel gears via an associated non-return mechanism 240. Such a non-return mechanism ensures that the irreversible nature of the transmission is maintained in the event of one or other of the two motors breaking down, and does so in a manner that is more efficient than using a purely mechanical device to achieve irreversibility. A spur gear 242 is thus mounted on each of the outlet shafts 207 and meshes with a gear 241 mounted at the outlet from each non-return mechanism 240, with each of these gears 241 being associated with a coaxial spur gear 243 meshing with a gear 211 associated with the bevel gear differential 203. The outlet shaft 204 of the bevel gear differential 203 is connected via a torque limiter 244 to a stepdown gear train 245 whose outlet shaft 254 causes the emergency unlocking lever 16 to pivot. The torque limiter 244 is preferably a friction limiter, and the stepdown gear train 245 is preferably a spur gear train analogous to each of the trains 208 in the first embodiment described above. This stepdown train 240 thus comprises in succession the following spur gears: 245.1, 245.2, 245.3, and 245.4.

The two embodiments of the invention shown in FIGS. 10 and 11 as descried above thus illustrate other ways of arranging for two electric motors 201 to be associated irreversibly with a common differential gear train 203. Each time there is a respective outlet shaft 204, 234, 254 which causes the emergency unlocking lever 16 to pivot, said lever co-operating with the locking lever 14 that is used in normal operation.

The person skilled in the art will understand that irreversibility can be obtained by means that are structurally different but that achieve the same function: by way of non-limiting example, mention can be made of an irreversible connection between a wheel and a tangential screw and the non-return systems as described above, or indeed a power failure brake placed behind each motor.

In any event, it is advantageous to provide for the electromechanical actuator 200 of the invention with its two electric motors 201 and its common differential gear train 203 to be fixed like the above-described electromagnetic actuator 100 to the box 11 in removable manner, and to make it easily accessible, so that it can be replaced directly by another actuator without it being necessary to dismantle said box.

The invention is not limited to the embodiments described above, but on the contrary covers any variant using equivalent means to reproduce the essential characteristics specified above.

What is claimed is:

1. A latch device, for latching an airplane landing gear or an airplane landing gear hatch, the device comprising a box containing a set of hinged elements mounted to pivot about respective parallel axes, said assembly including at least one hook and a locking lever connected to said hook by associated elastically deformable return means, said hook being unlocked by acting on said locking lever via first actuator means in a normal mode of operation, and via a second actuator means in an emergency mode of operation when said first actuator means fails to unlock the hook, wherein the second actuator means associated with the emergency mode of operation is an electromechanical actuator under independent electrical control, said second actuator comprising two electric motors associated in irreversible manner with a common differential gear train, having an outlet shaft controlling the pivoting of an emergency unlocking lever co-operating with the locking lever used in normal operation.

2. A latch device according to claim 1, wherein each motor of the electromechanical actuator is fitted downstream with a torque limiter, of the magnetic, mechanical, or friction type.

3. A latch device according to claim 2, wherein each motor is also fitted at its outlet with irreversible clamping means, of the magnetic type.

4. A latch device according to claim 1, wherein the outlet shaft of each of the two motors engages an associated stepdown gear train, the respective outlet shaft thereof being coupled in irreversible manner to the common differential gear train, the outlet shaft of the common differential gear train causing the emergency unlocking lever to pivot.

5. A latch device according to claim 4, wherein each stepdown gear train comprises spur gears, and the irreversible connection of its outlet shaft to the common differential gear train which is likewise made of spur gears, is provided by means of an associated wormscrew.

6. A latch device according to claim 1, wherein the outlet shaft of each of the two motors is coupled in irreversible manner to the common differential gear train, and the outlet shaft of said common differential gear train is connected to the inlet of an epicyclic stepdown gear train, the outlet shaft of said epicyclic stepdown gear train causing the emergency unlocking lever to pivot.

7. A latch device according to claim 6, wherein the irreversible connection of each outlet shaft with the common differential gear train which is made up of spur gears is provided by means of an associated wormscrew.

8. A latch device according to claim 1, wherein the outlet shaft of each of the two motors is connected to a common differential gear train made of bevel gears via an associated non-return mechanism, and the outlet shaft of said common differential gear train is connected via a torque limiter to a stepdown gear train whose outlet shaft causes the emergency unlocking lever to pivot.

9. A latch device according to claim 8, wherein the torque limiter is a friction torque limiter, and the stepdown gear train is made of spur gears.

10. A latch device according to claim 1, wherein the electromechanical actuator with its two electric motors and its common differential gear train is fixed to the box in removable manner, and is easily accessible, thereby enabling it to be directly replaced by another actuator without needing to dismantle said box.

11. A latch device according to claim 1, wherein the first actuator means associated with the normal mode of operation is likewise an electromechanical actuator under independent electric control, said actuator being of low power and being constituted by an electromagnet, or a motor and stepdown gear box unit, or a torque motor of small size.

* * * * *